(12) United States Patent
Lamb et al.

(10) Patent No.: US 8,223,749 B2
(45) Date of Patent: Jul. 17, 2012

(54) COMMUNICATION METHOD AND APPARATUS

(75) Inventors: Duncan Lamb, London (GB); Torsten Rehberg, London (GB); Simon Tickner, Kent (GB); Priidu Zilmer, Tallinn (EE); Dmytro Izotov, London (GB); Mike Bartlett, London (GB); Bettina Sutter, London (GB)

(73) Assignee: Skype, Dublin (IE)

( * ) Notice: Subject to any disclaimer, the term of this patent is extended or adjusted under 35 U.S.C. 154(b) by 1065 days.

(21) Appl. No.: 12/214,262

(22) Filed: Jun. 17, 2008

(65) Prior Publication Data

US 2009/0268716 A1 Oct. 29, 2009

(30) Foreign Application Priority Data

Apr. 24, 2008 (GB) .................................. 0807506.1

(51) Int. Cl.
*H04L 12/66* (2006.01)
(52) U.S. Cl. ........................................................ 370/352
(58) Field of Classification Search ........................ None
See application file for complete search history.

(56) References Cited

U.S. PATENT DOCUMENTS

| | | |
|---|---|---|
| 2003/0115375 A1* | 6/2003 | Robison ........................ 709/318 |
| 2005/0091314 A1 | 4/2005 | Blagsvedt et al. |
| 2005/0149620 A1 | 7/2005 | Kirkland et al. |
| 2005/0149622 A1 | 7/2005 | Kirkland et al. |
| 2006/0035632 A1 | 2/2006 | Sorvari et al. |
| 2006/0155785 A1 | 7/2006 | Berry et al. |
| 2007/0033250 A1 | 2/2007 | Levin et al. |

FOREIGN PATENT DOCUMENTS

WO  WO 2005/009019 A2  1/2005

OTHER PUBLICATIONS

European Search Report for EP 11151525.0-2414, Dated May 9, 2011, consisting of 6 pgs.
International Search Report and The Written Opinion of the International Searching Authority, date of mailing Jul. 15, 2009.

* cited by examiner

*Primary Examiner* — Chirag Shah
*Assistant Examiner* — Amar Persaud
(74) *Attorney, Agent, or Firm* — Wolfe-SBMC

(57) ABSTRACT

A method of sorting communication events at a user terminal connected to a communication network and executing a communication client arranged to be operable by a user is provided. The method comprises storing an event list comprising a list of identifiers, each identifier having information relating to at least one previously received communication event associated therewith, wherein the identifier identifies the initiator of the associated at least one previously received communication event and each identifier is listed only once in the list of identifiers. The event list is displayed in a user interface of the communication client. The method further comprises receiving an incoming communication event at the user terminal from an initiating user over the communication network and determining whether the initiating user is present in the list of identifiers stored in the event list. In the case that the initiating user is present in the list of identifiers, the event list is amended by adding information relating to the incoming communication event to the information relating to the at least one previously received communication event associated with the identifier of the initiating user. In the case that the initiating user is not present in the list of identifiers, a new entry is created at the top of the event list comprising an identifier for the initiating user and having information relating to the incoming communication event associated therewith. The display of the event list is updated in the user interface of the communication client.

48 Claims, 12 Drawing Sheets

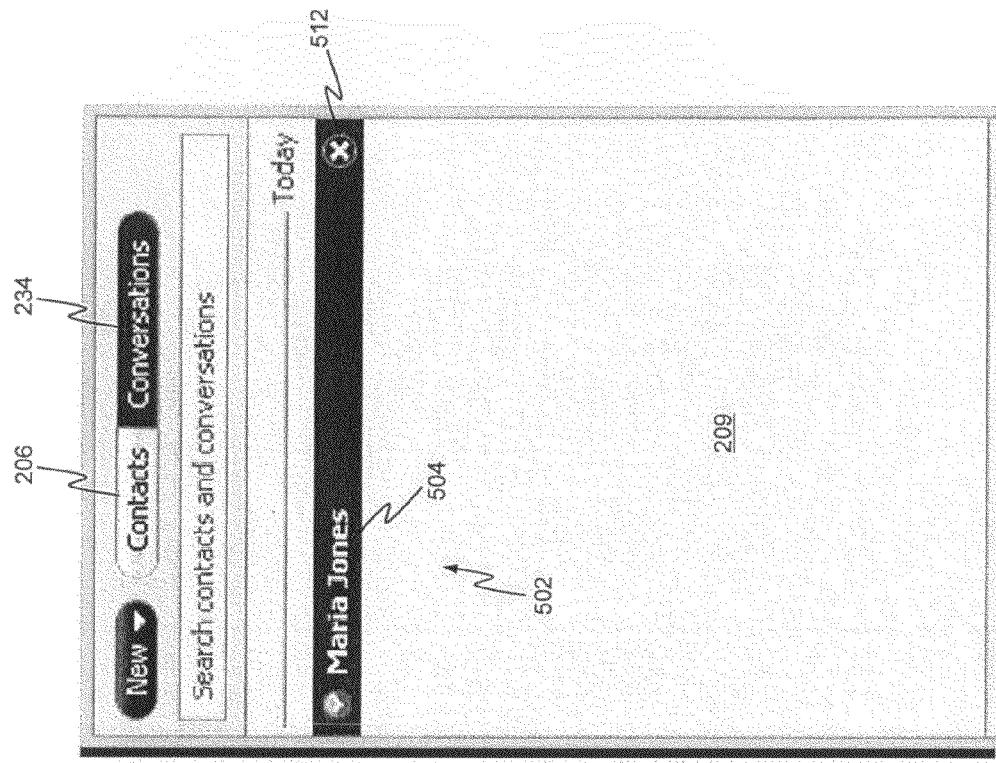
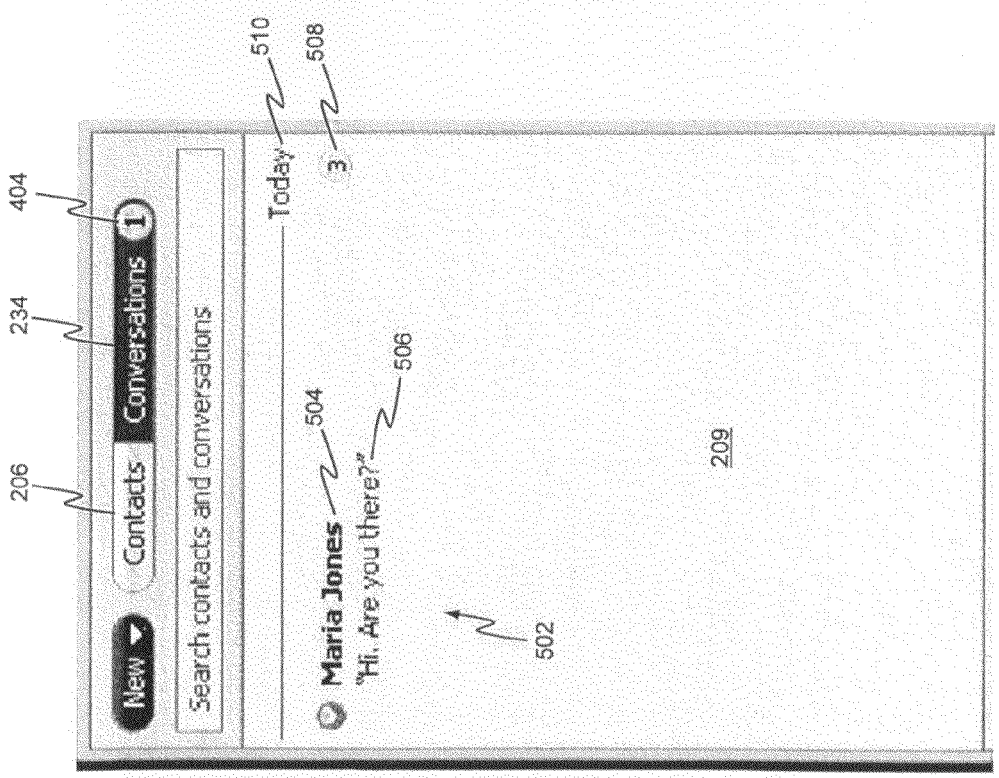
FIGURE 5A
FIGURE 5B

COMMUNICATION METHOD AND APPARATUS

RELATED APPLICATION

This application claims priority under 35 U.S.C. §119 or 365 to Great Britain, Application No. 0807506.1, filed Apr. 24, 2008. The entire teachings of the above application are incorporated herein by reference.

TECHNICAL FIELD

This invention relates to a communication method and apparatus, particularly but not exclusively for use in packet-based communication systems.

BACKGROUND

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging, voicemail and file transfer.

SUMMARY

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

The client software enables a large variety of different communication events (e.g. voice calls, instant messages, voicemails, video calls and file transfers) to be received at the user terminal of a user from a potentially large number of contacts. It can therefore be difficult for the user to keep track of the ongoing conversations and communication events that are received at the client.

The invention seeks to provide a method of sorting communication events at a user terminal that enables the user to readily maintain and access ongoing communications.

According to one aspect of the invention there is provided a method of sorting communication events at a user terminal connected to a communication network and executing a communication client arranged to be operable by a user, the method comprising: storing an event list comprising a list of identifiers, each identifier having information relating to at least one previously received communication event associated therewith, wherein the identifier identifies the initiator of the associated at least one previously received communication event and each identifier is listed only once in the list of identifiers; displaying the event list in a user interface of the communication client; receiving an incoming communication event at the user terminal from an initiating user over the communication network; determining whether the initiating user is present in the list of identifiers stored in the event list; in the case that the initiating user is present in the list of identifiers, amending the event list by adding information relating to the incoming communication event to the information relating to the at least one previously received communication event associated with the identifier of the initiating user; in the case that the initiating user is not present in the list of identifiers, creating a new entry at the top of the event list comprising an identifier for the initiating user and having information relating to the incoming communication event associated therewith; and updating the display of the event list in the user interface of the communication client.

According to another aspect of the invention, there is provided a user terminal connected to a communication network and executing a communication client arranged to be operable by a user, comprising: a storage means arranged to store an event list comprising a list of identifiers, each identifier having information relating to at least one previously received communication event associated therewith, wherein the identifier identifies the initiator of the associated at least one previously received communication event and each identifier is listed only once in the list of identifiers; a receiving means arranged to receive an incoming communication event at the user terminal from an initiating user over the communication network; a processing means arranged to determine whether the initiating user is present in the list of identifiers stored in the event list, such that, in the case that the initiating user is present in the list of identifiers, the processing means is arranged to amend the event list by adding information relating to the incoming communication event to the information relating to the at least one previously received communication event associated with the identifier of the initiating user, and, in the case that the initiating user is not present in the list of identifiers, the processing means is arranged to create a new entry at the top of the event list comprising an identifier for the initiating user and having information relating to the incoming communication event associated therewith; and a display means arranged to display the event list in a user interface of the communication client.

According to another aspect of the invention, there is provided a method of sorting communication events at a user terminal connected to a communication network and executing a communication client arranged to be operable by a user, the method comprising: storing an event list comprising a list of identifiers, each identifier having information relating to at least one previously received communication event and a priority weighting associated therewith, wherein the identifier identifies the initiator of the associated at least one previously received communication event, each identifier is listed only once in the list of identifiers, and the event list is ordered according to the priority weighting; displaying the event list in a user interface of the communication client; receiving an incoming communication event at the user terminal from an initiating user over the communication network; determining whether the initiating user is present in the list of identifiers stored in the event list; in the case that the initiating user is present in the list of identifiers, amending the event list by adding information relating to the incoming communication event to the information relating to the at least one previously received communication event associated with the identifier of the initiating user; in the case that the initiating user is not present in the list of identifiers, determining the priority weighting for the incoming communication event and creating a new entry at a position in the event list in dependence on the priority weighting, the new entry comprising an identifier for the initiating user and having information relating to the incoming communication event associated therewith; and updating the display of the event list in the user interface of the communication client.

According to another aspect of the invention, there is provided a user terminal connected to a communication network and executing a communication client arranged to be operable by a user, comprising: a storage means arranged to store an event list comprising a list of identifiers, each identifier having information relating to at least one previously received communication event and a priority weighting associated therewith, wherein the identifier identifies the initiator of the associated at least one previously received communication event, each identifier is listed only once in the list of identifiers, and the event list is ordered according to the priority weighting; a receiving means arranged to receive an incoming communication event at the user terminal from an initiating user over the communication network; a processing means arranged to determine whether the initiating user is present in the list of identifiers stored in the event list, such that, in the case that the initiating user is present in the list of identifiers, the processing means is arranged to amend the event list by adding information relating to the incoming communication event to the information relating to the at least one previously received communication event associated with the identifier of the initiating user, and, in the case that the initiating user is not present in the list of identifiers, the processing means is arranged to determine the priority weighting for the incoming communication event and create a new entry at a position in the event list in dependence on the priority weighting, the new entry comprising an identifier for the initiating user and having information relating to the incoming communication event associated therewith; and a display means arranged to display the event list in a user interface of the communication client.

According to another aspect of the invention, there is provided a computer program product comprising program code means which when executed by a computer implement the steps according to the above-described method.

BRIEF DESCRIPTION OF THE DRAWINGS

For a better understanding of the present invention and to show how the same may be put into effect, reference will now be made, by way of example, to the following drawings in which:

FIGS. 5A and 5B shows a conversation list user interface of a communication client.

DETAILED DESCRIPTION

Figure 1:
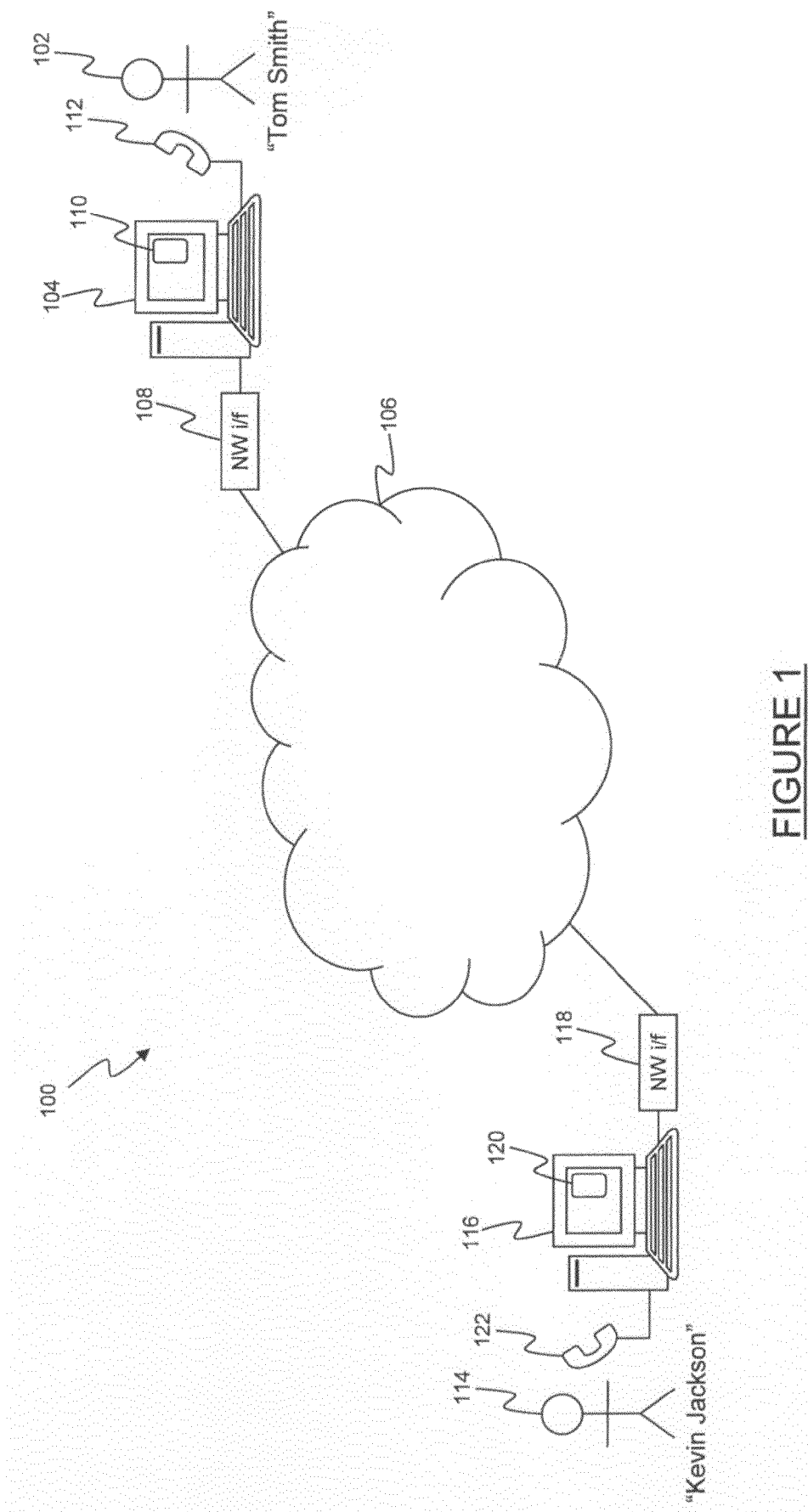
FIG. 1 shows a packet-based communication system.

Reference is first made to FIG. 1, which illustrates a P2P communication system 100. Note that whilst this illustrative embodiment is described with reference to a P2P communication system, other types of communication system could also be used, such as non-P2P, VoIP systems. A first user of the P2P communication system (named "Tom Smith" 102) operates a user terminal 104, which is shown connected to a P2P network 106. Note that the P2P network 106 utilises a communication system such as the Internet. The user terminal 104 may be, for example, a personal computer ("PC"), personal digital assistant ("PDA"), a mobile phone, a gaming device or other embedded device able to connect to the P2P network 106. The user device is arranged to receive information from and output information to a user of the device. In a preferred embodiment of the invention the user device comprises a display such as a screen and a keyboard and mouse. The user device 104 is connected to the P2P network 106 via a network interface 108 such as a modem, and the connection between the user terminal 104 and the network interface 108 may be via a cable (wired) connection or a wireless connection.

The user terminal 104 is running a client 110, provided by the P2P software provider. The client 110 is a software program executed on a local processor in the user terminal 104. The user terminal 104 is also connected to a handset 112, which comprises a speaker and microphone to enable the user to listen and speak in a voice call. The microphone and speaker does not necessarily have to be in the form of a traditional telephone handset, but can be in the form of a headphone or earphone with an integrated microphone, or as a separate loudspeaker and microphone independently connected to the user terminal 104.

Figure 2:
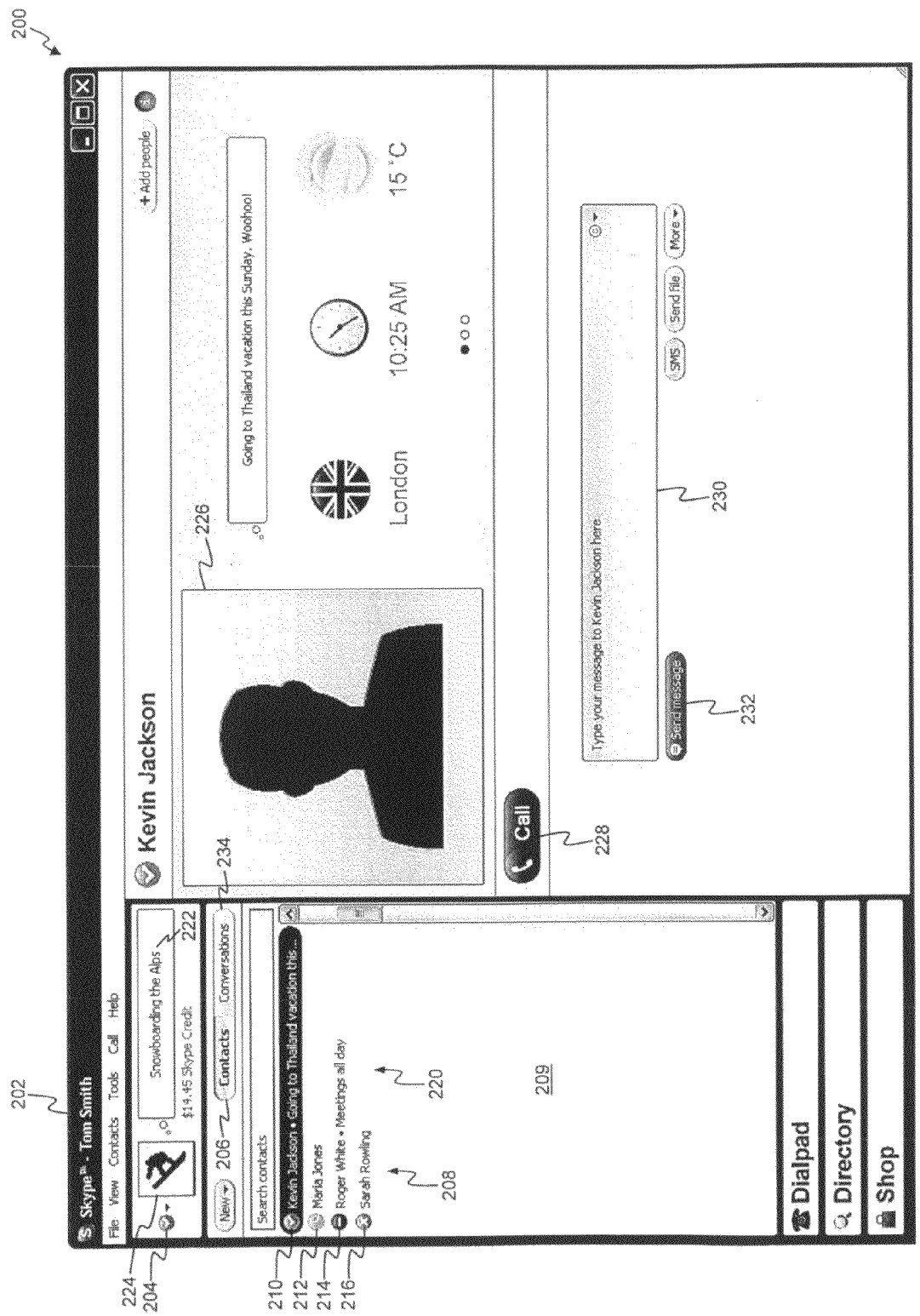
FIG. 2 shows a user interface of a communication client.

An example of a user interface 200 of the client 110 executed on the user terminal 104 of the first user "Tom Smith" 102 is shown illustrated in FIG. 2. The client user interface 200 displays the username 202 of "Tom Smith" 102 in the P2P system, and the user can set his own presence state (that will be seen by other users) using a drop down list by selecting icon 204.

The client user interface 200 comprises a button 206 labelled "contacts", and when this button is selected the contacts stored by the user in a contact list are displayed in a pane 209 below the button 206. In the example user interface in FIG. 2, four contacts of other users of the P2P system are shown listed in contact list 208. Each of these contacts have authorised the user of the client 110 to view their contact details and presence state and mood message information. Each contact in the contact list has a presence status icon associated with it. For example, the presence status icon for "Kevin Jackson" 210 indicates that this contact is "online", the presence icon for "Maria Jones" 212 indicates that this contact is "not available", the presence icon for "Roger White" 214 indicates that this contact's state is "do not disturb", the presence icon for "Sarah Rowling" 216 indicates that this contact is "offline". Further presence indications can also be included. Next to the names of the contacts in pane 209 are mood messages 220 of the contacts.

The contact list for the users (e.g. the contact list 208 for "Tom Smith") is stored in a contact server (not shown in FIG. 1). When the client 110 first logs into the P2P system the contact server is contacted, and the contact list is downloaded to the user terminal 104. This allows the user to log into the P2P system from any terminal and still access the same contact list. The contact server is also used to store the user's own mood message (e.g. a mood message 222 of the first user 102) and a picture 224 selected to represent the user (known as an avatar). This information can be downloaded to the client 110, and allows this information to be consistent for the user when logging on from different terminals. The client 110 also periodically communicates with the contact server in order to obtain any changes to the information on the contacts in the contact list, or to update the stored contact list with any new contacts that have been added. Presence state information is not stored centrally in the contact server. Rather, the client 110 periodically requests the presence state information for each of the contacts in the contact list 208 directly over the P2P system. Similarly, the current mood message for each of the contacts, as well as a picture (avatar—e.g. picture 226 for "Kevin Jackson") that has been chosen to represent the contact, are also retrieved by the client 110 directly from the respective clients of each of the contacts over the P2P system.

Calls to the P2P users in the contact list may be initiated over the P2P system by selecting the contact and clicking on a "call" button 228 using a pointing device such as a mouse. Referring again to FIG. 1, the call set-up is performed using proprietary protocols, and the route over the network 106 between the calling user and called user is determined by the peer-to-peer system without the use of servers. For example, the first user 102 can call a second user "Kevin Jackson" 114.

Following authentication through the presentation of digital certificates (to prove that the users are genuine subscribers of the P2P system—described in more detail in WO 2005/009019), the call can be made using VoIP. The client 110 performs the encoding and decoding of VoIP packets. VoIP packets from the user terminal 104 are transmitted into the network 106 via the network interface 108, and routed to a computer terminal 116 of the called party 114, via a network interface 118. A client 120 (similar to the client 110) running on the user terminal 116 of the called user 114 decodes the VoIP packets to produce an audio signal that can be heard by the called user using the handset 122. Conversely, when the second user 114 talks into handset 122, the client 120 executed on user terminal 116 encodes the audio signals into VoIP packets and transmits them across the network 106 to the user terminal 104. The client 110 executed on user terminal 104 decodes the VoIP packets, and produces an audio signal that can be heard by the user of the handset 112.

The VoIP packets for calls between P2P users (such as 102 and 114) as described above are passed across the network 106 only, and the PSTN network is not involved. Furthermore, due to the P2P nature of the system, the actual voice calls between users of the P2P system can be made with no central servers being used. This has the advantages that the network scales easily and maintains a high voice quality, and the call can be made free to the users. Additionally, calls can also be made from the client (110, 122) using the P2P system to fixed-line or mobile telephones, by routing the call to the PSTN network. Similarly, calls from fixed-line or mobile telephones can be made to the P2P system via the PSTN.

In addition to making voice calls, the user of the client 110 can also communicate with the users listed in the contact list 208 in several other ways. For example, an instant message (also known as a chat message) can be sent by typing a message in box 230 and sending it by selecting the "send message" button 232. Additionally, the first user 102 can use the client 110 to transmit files to users in the contact list 208, send voicemails to the contacts or establish video calls with the contacts (not illustrated in FIG. 2).

Figure 3:
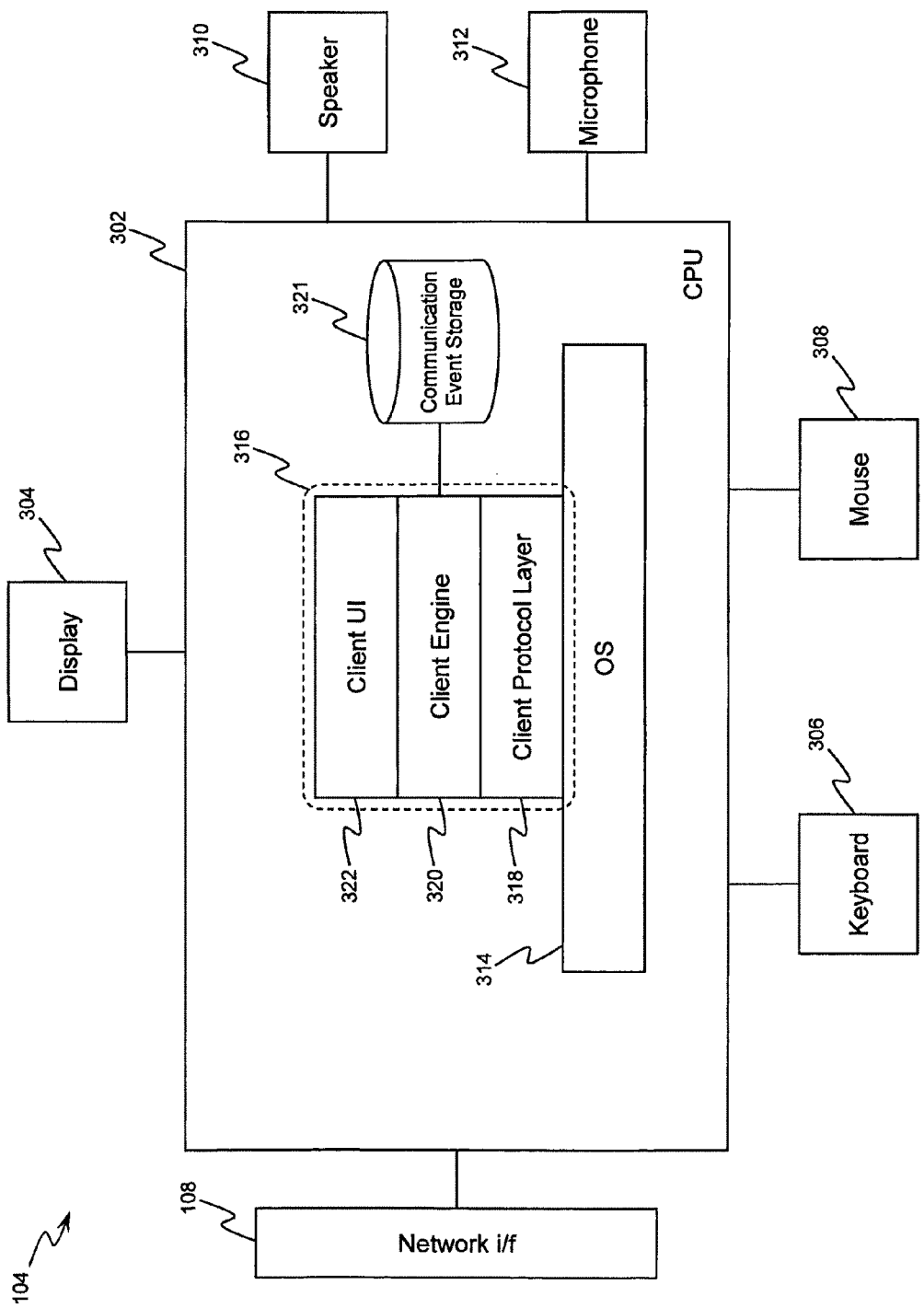
FIG. 3 shows a user terminal on which is executed a communication client.

FIG. 3 illustrates a detailed view of the user terminal (104) on which is executed client 110. The user terminal 104 comprises a central processing unit ("CPU") 302, to which is connected a display 304 such as a screen, an input device such as a keyboard 306, a pointing device such as a mouse 308, a speaker 310 and a microphone 312. The speaker 310 and microphone 312 may be integrated into a handset 112 or headset, or may be separate. The CPU 302 is connected to a network interface 108 as shown in FIG. 1.

FIG. 3 also illustrates an operating system ("OS") 314 executed on the CPU 302. Running on top of the OS 314 is a software stack 316 for the client 110. The software stack shows a protocol layer 318, a client engine layer 320 and a client user interface layer ("UI") 322. Each layer is responsible for specific functions. Because each layer usually communicates with two other layers, they are regarded as being arranged in a stack as shown in FIG. 3. The operating system 314 manages the hardware resources of the computer and handles data being transmitted to and from the network via the network interface 108. The client protocol layer 318 of the client software communicates with the operating system 314 and manages the connections over the P2P system. Processes requiring higher level processing are passed to the client engine layer 320. The client engine 320 also communicates with the client user interface layer 322. The client engine 320 may be arranged to control the client user interface layer 322 to present information to the user via the user interface of the client (as shown in FIG. 2) and to receive information from the user via the user interface.

Furthermore, the client engine layer 320 is also arranged to store information relating to communication events received at the client in a storage device 321. For example, the client engine 320 stores messages (e.g. IM chat messages) as well as information about communication events, such as their sender and the time they are received. The client engine layer 320 is arranged to control the display of information regarding these communication events to the user on the display 304, and also perform calculations on the information contained therein, as described hereinafter.

A communication client may therefore be capable of receiving a variety of different types of communication event. Furthermore, these communication events can often be received contemporaneously, such that, for example, voice calls, IM messages and file transfers are all received in close succession. It can therefore become difficult for the user to manage all the communication events that are happening in the client. This is compounded if the user has a large number of contacts. This is particularly the case when the client is arranged to open a new user interface window for each communication event that is incoming to the client. This can often result in the user having many windows open on his user terminal, each of which can have different communications ongoing with different contacts. This can cause a great deal of confusion to the user, as it becomes hard to manage all the open windows. Frequently, this leads the user to close some of the windows, with the result that the user neglects certain ongoing communications by, for example, forgetting to reply to a message. It is therefore advantageous to have a technique of organising and sorting all the communication events at the client, such the communication events can be much more easily and effectively managed by the user. Such a technique is presented herein.

Figure 4B:
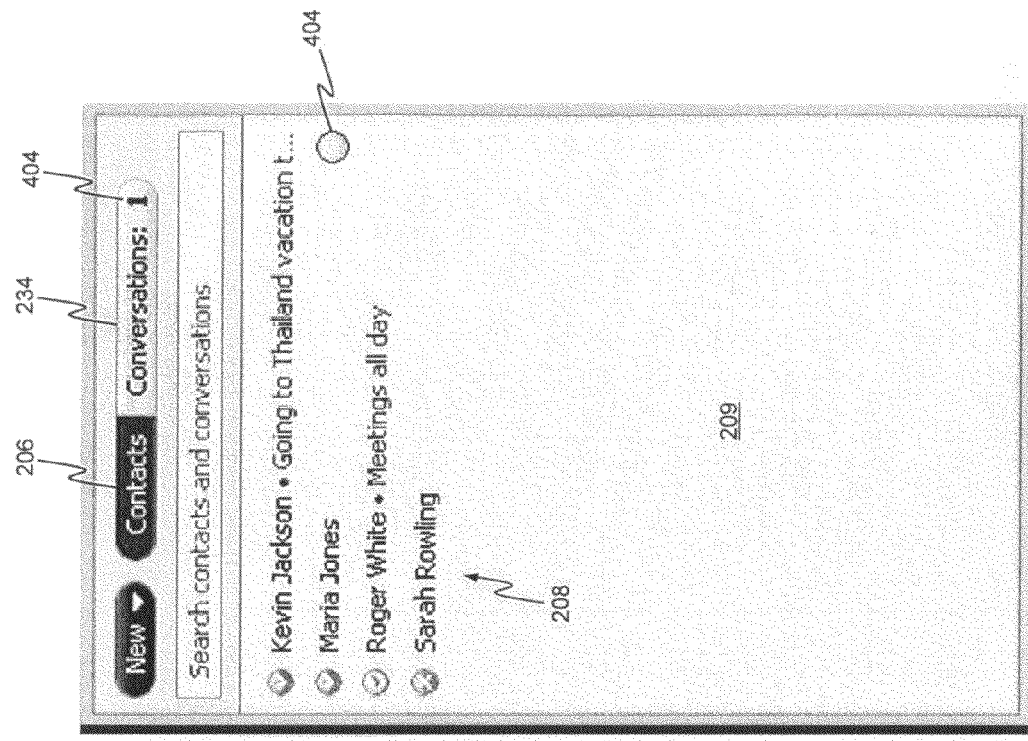
FIGS. 4A and 4B shows a contact list user interface of a communication client.
Figure 4A:
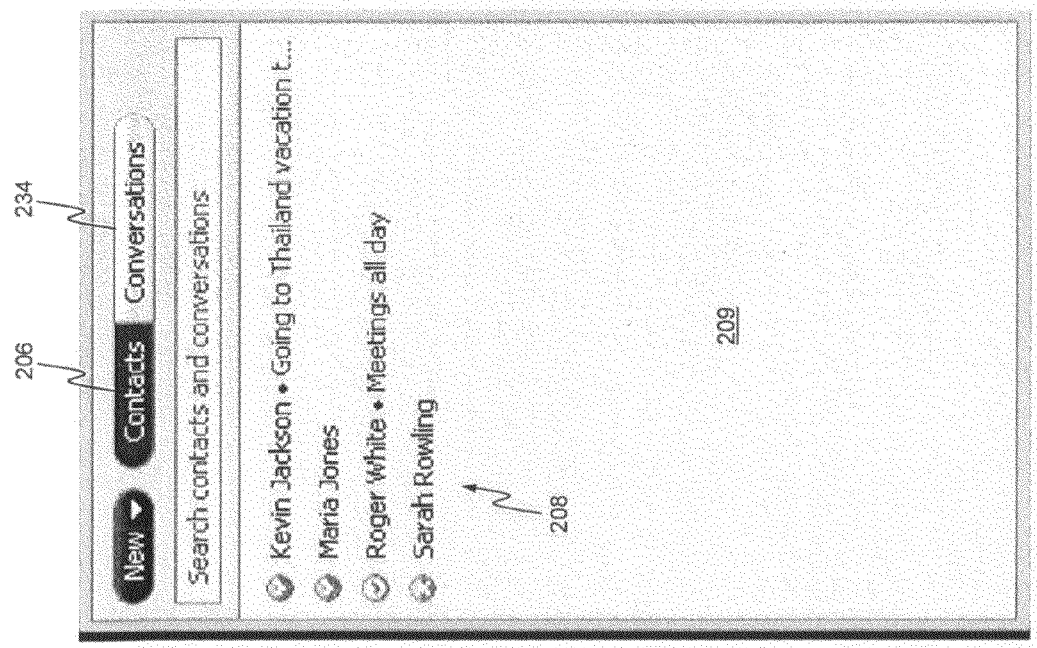

To describe the operation of the method of sorting and arranging the communication events, reference is first made to FIG. 4A. FIG. 4A illustrates the pane 209 of the client user interface, as shown in FIG. 2, prior to a communication event being received at the user terminal 104. The button labelled "Contacts" 206 has been selected such that the full contact list 208 of the user is displayed.

FIG. 4B illustrates the pane 209 of the client user interface following a communication event being received at the user terminal 104. In this example, a communication event is received from the user "Maria Jones". This is, for example, an IM chat message, although other types of communication event could also be received. The receipt of the communication event is processed by the client engine 320 and stored in the communication event storage device 321. The receipt of a communication event is indicated with a marker 402 next to the contact's name in the contact list 208. In addition, a button labelled "Conversations" 234 is highlighted, preferably by changing the button's colour (not illustrated in FIG. 4B) and by the addition of a numeric indicator 404 to indicate to the user the number of new communication events that have been received. The "Conversations" button 234 enables the user to view currently active communication events, thereby enabling the user to quickly and efficiently see what communication is ongoing in the client. The operation of the "Conversations" button 234 is described hereinafter.

FIG. 5A illustrates the effect of the user selecting the "Conversations" button 234. When the "Conversations" button 234 is selected, the contact list 208 is removed from the pane 209, and replaced by a list of conversations 502 that the user is or has been engaged in using the client 110. A "conversation" in this context corresponds to an aggregation of the communication events that the user has had (or is having) with a particular contact. For example, the "conversation" stream between the user "Tom Smith" and "Kevin Jackson" (as illustrated in FIG. 1) can comprise a plurality of IM chats, voice calls, file transfers and voicemails sent and received over a period of time.

Therefore, a "conversation" for a certain contact is a grouping of all the different types of communication event that has occurred with that contact, sorted by the name of the contact. Information on the conversation stream with a particular contact is accessible to the user by selecting the contact's name in the conversation list 502.

Therefore, a conversation list is a list of ongoing communications, organised by the names of the contacts with which communications is ongoing. In particular, the name of a contact appears only once in the contact list, and information regarding all the ongoing communications (potentially of different types) with this contact is accessible by the user selecting the name of the contact. An entry for a particular contact is included in the conversation list after receipt of a communication event from the contact, and this entry remains in the conversation list until it is manually cleared by the user.

In the case of the example shown in FIG. 5A, a single communication event has occurred, which is an IM chat received from "Maria Jones". The numeric indicator 402 on the "Conversations" button 234 indicates that there is one unacknowledged (unread) conversation. The conversation list 502 displays the name 504 of the contact from which the communication event was received and a summary 506 of the communication (e.g. the first line of the IM chat in this example). A further numerical indicator 508 shows the number of unacknowledged communication events that have been received from this particular contact. A date indicator 510 indicates the date on which the communication event present in the conversation list 502 was received.

In the specific case of IM chat messages, the further numeric indicator 508 counts the number of individual unread chat messages that are received from a particular contact in a single session. Therefore, the number in the further numerical indicator 508 can be higher than the number shown in the indicator 402 on the "Conversations" button 234. This is because the number shown in the indicator 402 on the "Conversations" button 234 indicates the total number of unacknowledged conversations, whereas the further numerical indicator 508 indicates the number of unread messages. In other words, the example in FIG. 5A indicates that there is one unread conversation, and this conversation comprises three unread IM chat messages.

Note that the number shown on the numeric indicator 508 does not only refer to IM chat messages, but represents an aggregate of all other unacknowledged communication events, including further events such as file transfers, voicemails, missed calls and other events.

Therefore, when new communication events are received at the client, they are stored in the communication event storage 321 (along with their date and time of arrival) and displayed in the conversation list 502 according to the contact to which they relate. Hence, the information is arranged according to the contact from which the communication event was received, regardless of the type of communication or whether there is a combination thereof.

FIG. 5B illustrates the conversation list 502 after the user 102 has selected the entry from "Maria Jones". When a conversation listed under a contact's name in the conversation list 502 is selected, the information related to the communication event is displayed to the user. For example, in the case of the IM chat in FIG. 5B, the three IM chat messages sent from "Maria Jones" are displayed in another portion of the client user interface (not shown in FIG. 5B). Because these messages are now considered to have been read or acknowledged by the user, the look of the entry in the conversation list is changed, preferably so that the summary (506 in FIG. 5A) is removed. The user can now tell that this entry relates to a conversation that has been read.

When an entry in the conversation list 502 has been selected by the user 102, the further numerical indicator 508 is replaced by a "close" button 512. The "close" button 502 removes the entry for this contact from the conversation list 502. This allows the user 102 to manually control which conversations remain in the conversation list (e.g. if they require further action, replies, etc.) and which ones can be removed (e.g. if they have been acknowledged or can be ignored). It should be noted that if an entry is removed from the conversation list 502 using the close button 512, then the contact is not removed from contact list 208, and the information regarding the communication event or contained therein may further remain accessible to the user via an additional stored communication history record.

Obviously, unless the user is proactively removing entries from the conversation list 502 as soon as they are read, then it will quickly become populated with a large number of contacts from whom communication events have been received, such that it becomes unwieldy for the user to distinguish which communication events are new and need acting upon, and which are old or can be ignored. This therefore becomes similar to a simple history of all communication events received at the client. This has the same problem as the contact list, in that it is difficult to manage the active conversations. A technique for managing the entries in the conversation list 502 to solve this problem is described with reference to FIG. 6.

Figure 6:
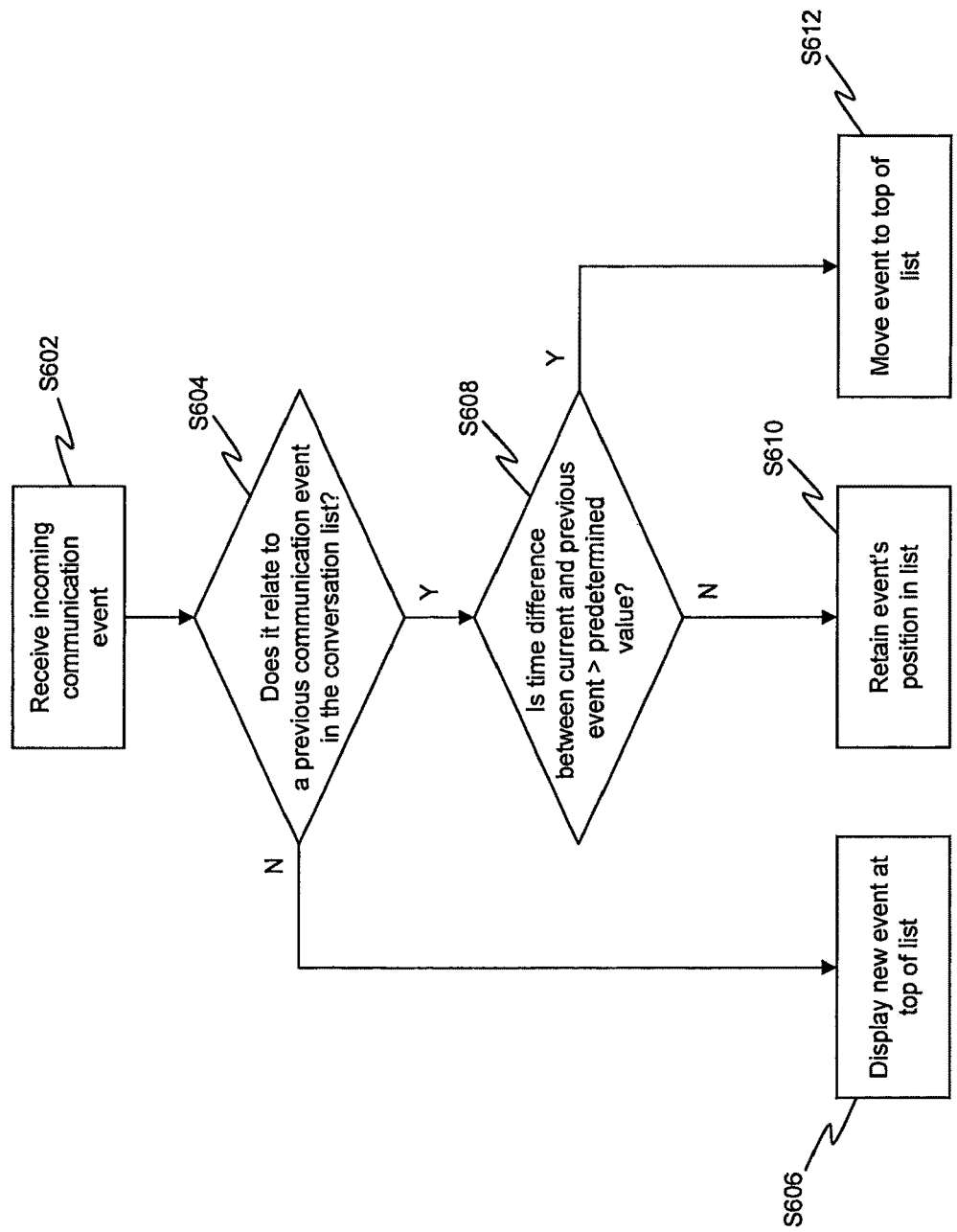
FIG. 6 shows a flowchart of a method of sorting the entries in the conversation list.

FIG. 6 illustrates a flowchart for determining how to sort the entries in the conversations list 502. Specifically, the flowchart in FIG. 6 determines where in the conversation list 502 an entry should be placed when a communication event arrives at the client 110.

In step S602 a communication event is received at the client 110 from a contact of the user 102. In step S604, it is checked whether the incoming communication event relates to a previous entry already present in the conversation list 502. Preferably, this step checks whether an entry is already present in the conversation list 502 from the same contact as the newly received communication event.

If this is not the case, then the incoming communication event requires a new entry in the conversations list 502. As this is a new entry in the list, it needs to be made prominent to the user. Entries that are at the top of the conversations list are the most prominent to the users, and hence the most likely to be seen and acted upon. Therefore, in step S606, the new entry is placed at the top of the conversation list 502.

If the incoming communication event does relate to a previously received communication event that is still listed in the conversation list 502 (e.g. if a new communication event is received from a contact already listed in the conversation list, regardless of whether it is the same type of communication event), then a decision has to be made as to whether to maintain the current entry in its existing position in the list, but update it to indicate a new communication event has been received (i.e. increment the numerical indicator 508 and show the summary 506 shown in FIG. 5A), or to move the entry for this contact in the conversation list 502 to the top of the list (and also increment the numerical indicator 508 and show the summary 506 shown in FIG. 5A).

It is important to appreciate that there is never more than one entry in the conversation list for a particular contact. Therefore, the choice is only whether to move the existing entry in the conversation list or to keep it in its existing position. However, there is a trade-off to be made between moving the entries and maintaining them. Moving an entry to the top of the list makes it more prominent to the user. However, excessive rearrangement of the entries in the conversation list makes it difficult for the user to keep track of where entries are, and hence it becomes more difficult for the user to find a given entry again.

In preferred embodiments, to avoid excessive rearrangement of conversation list entries, and the consequential confusion caused to the user, the entry for a particular contact is only moved in the conversation list 502 if a predetermined period of time has elapsed since the previous most recent communication event for that contact was received. In step S608, the time of arrival of the new communication event is compared to the time of the previous communication event for this contact.

In the case that the time difference between the current and previous communication event for this contact is less than the predetermined period, then, in step S610, the position of the contact in the conversation list 502 is maintained (i.e. not moved), but is updated to reflect the new communication event (i.e. incrementing the numerical indicator 508 and adding the summary 506 as shown in FIG. 5A). This ensures that when several communication events are arriving from a particular contact in reasonably close succession, the entry in the conversation list 502 is not constantly moving to the top of the list. This is particularly useful in the case that there are further concurrent communication events arriving from other contacts, as this would otherwise result in the entry at the top of the conversation list 502 swapping frequently between the active contacts as the communication events arrived.

In the case that the time difference between the current and previous communication event for this contact is greater than the predetermined period, then, in step S612, the position of the contact in the conversation list 502 is moved to the top of the conversation list 502. The entry is also updated to reflect the new communication event (i.e. incrementing the numerical indicator 508 and adding the summary 506 as shown in FIG. 5A).

Preferably, the predetermined time period above which the entry in the conversation list is moved to the top is one hour. However, the value used can be configurable to any value depending on user behaviour and the types of communication events that can be received at the client 110.

Figures 7A, 7B, 7C:
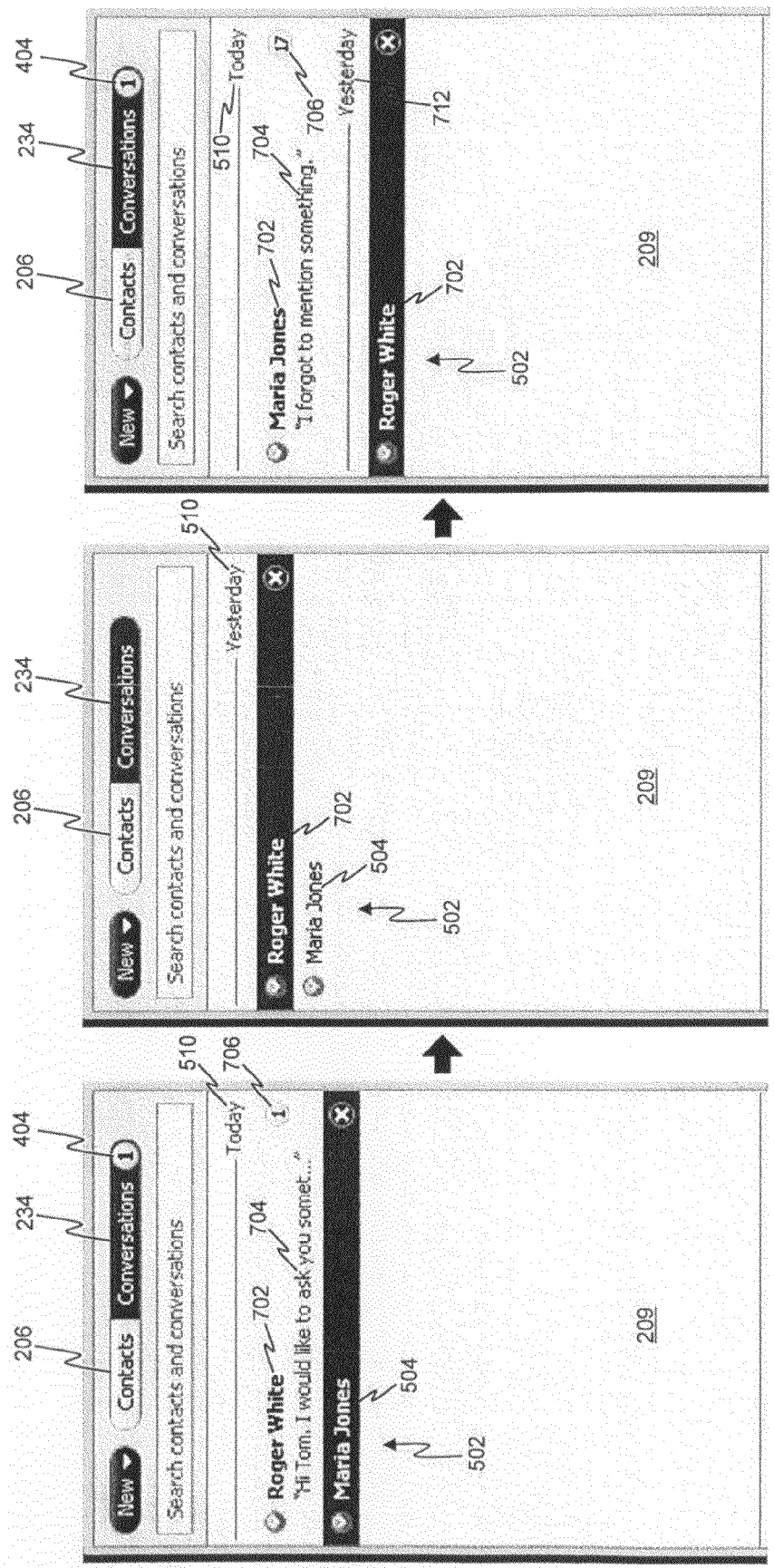
FIG. 7A-7C shows the behaviour of the conversation list with new communication events in a first scenario.

The operation of the flowchart in FIG. 6 is further illustrated with reference to FIGS. 7A-C and 8A-C. Reference is first made to FIG. 7A, which illustrates the conversation list 502 shown in the pane 209 in the state as shown in FIG. 5B, such that a communication event (in this case in IM chat message) has been received from "Maria Jones" and read by the user. In addition, a further new communication event has been received from a different contact, "Roger White".

Because there is not a previous entry in the conversation list 502 for "Roger White", then the result of the analysis in step S604 is negative and the entry 702 is displayed at the top of the conversation list 502 (step S606), as illustrated in FIG. 7A. The entry 702 for "Roger White" also has a summary 704 and a numerical indicator 706 showing the number of unacknowledged communication events, in order to indicate to the user that there are unread/unacknowledged communication events from this contact.

In FIG. 7B, time has passed since the communication event from "Roger White" arrived. Specifically, the user has viewed the message from "Roger White" by selecting the entry 702 in the conversation list 502, such that only his name is now displayed (i.e. the summary 704 and indicator 706 are removed), and sufficient time has elapsed such that the communication events from "Roger White" and "Maria Jones" are shown as having been received yesterday by date indicator 510. In particular, the time elapsed since the last communication event from "Maria Jones" is greater than the predetermined time in step S608.

FIG. 7C shows the situation where, following the elapsed time, an additional communication event has been received from "Maria Jones". Because there is already an entry 504 in the conversation list 502 for "Maria Jones", the result of the analysis in step S604 is positive, and the time difference between the new and previous communication event of "Maria Jones" is considered in step S608. As stated above, this is greater than the predetermined time period. Therefore, according to step S612, the entry 504 for "Maria Jones" is moved to the top of the conversation list 502, as illustrated in FIG. 7C. The presence of an unread communication event is indicated to the user by the addition of summary line 708 and a numerical indicator 710 to show the number of unacknowledged communication events from this contact. Indicator 402 is also incremented. The date indicator 510 now shows that the communication event from "Maria Jones" was received today. An additional date indicator 712 is therefore required for yesterday, under which the entry for "Roger White" remains.

Figures 8A, 8B, 8C:
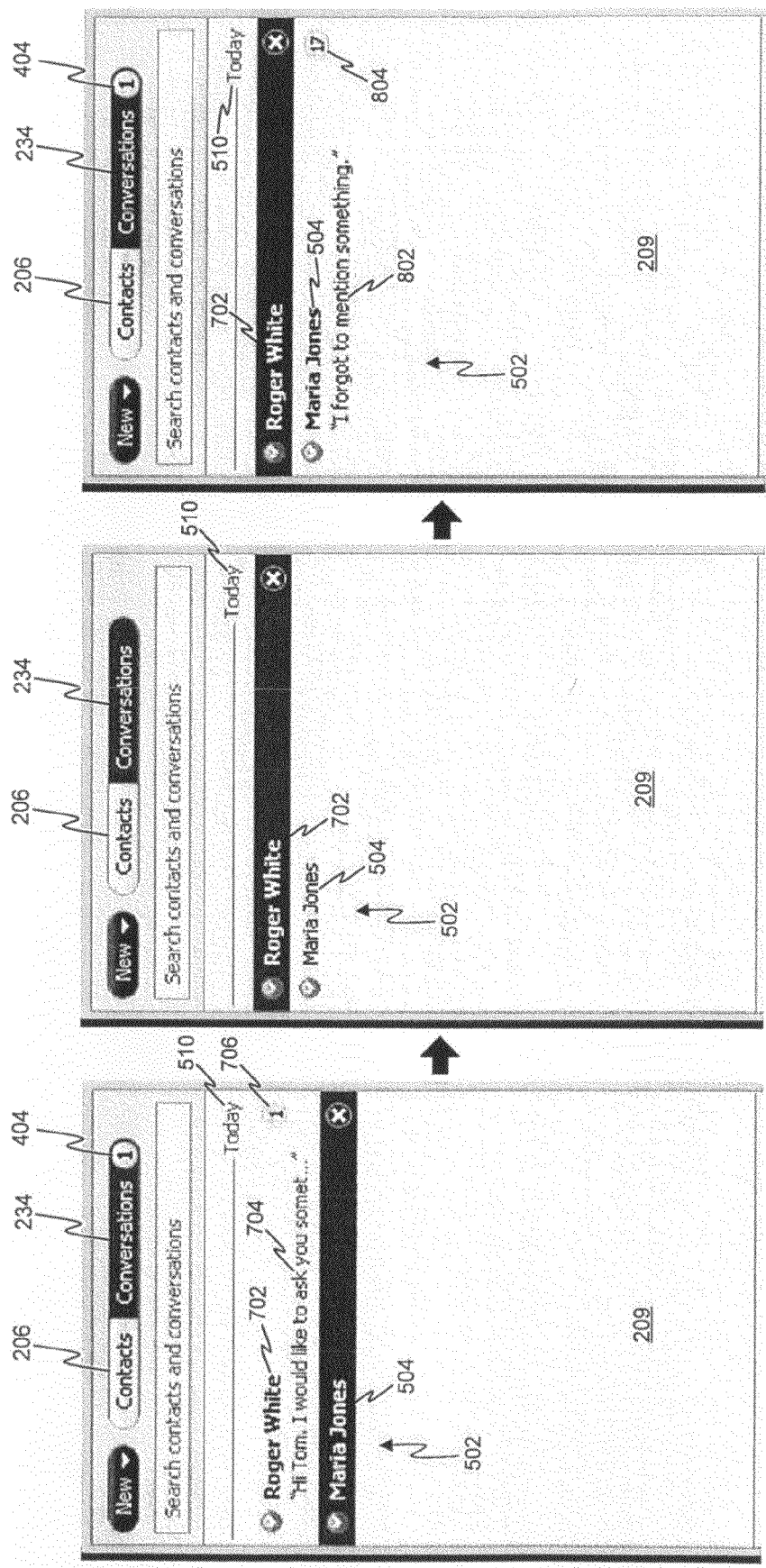
FIG. 8A-8C shows the behaviour of the conversation list with new communication events in a second scenario.

An alternative scenario is illustrated with reference to FIGS. 8A-8C. FIG. 8A shows an identical scenario to FIG. 7A, in that a communication event has been received from "Roger White" which is placed at the top of the conversation list 502. FIG. 8B shows a similar scenario to FIG. 7B described above, except that a shorter period of time has elapsed. In particular, the time that has elapsed since the arrival of the communication event for "Maria Jones" at entry 504 in the conversation list 502 is less than the predetermined time period of S608. Note that (in comparison to FIG. 7B) the date indicator 510 still reads "today".

FIG. 8C shows the situation where, following the elapsed time, an additional communication event has been received from "Maria Jones". Because there is already an entry 504 in the conversation list 502 for "Maria Jones", the result of the analysis in step S604 is positive. The time difference between the new and previous communication event of "Maria Jones" is considered in step S608, which is, as stated above, less than the predetermined time period. Therefore, according to step S610, the entry 504 for "Maria Jones" is maintained in its current position (and not moved to the top of the conversation list 502) as illustrated in FIG. 8C. The presence of an unread communication event is indicated to the user by the addition of summary line 802 and a numerical indicator 804 to show the number of unacknowledged communication events from this contact. Indicator 402 is also incremented.

Therefore, FIGS. 7A-7C illustrate the case where a communication event is received, and the time elapsed since the previous communication event from that contact was received is greater than a predetermined period, and FIGS. 8A-8C illustrate the case where the time period is less than a predetermined period. This technique ensures that entries in the conversation list are not moved around unnecessarily, thereby increasing the usability of the conversation list.

Figure 9:
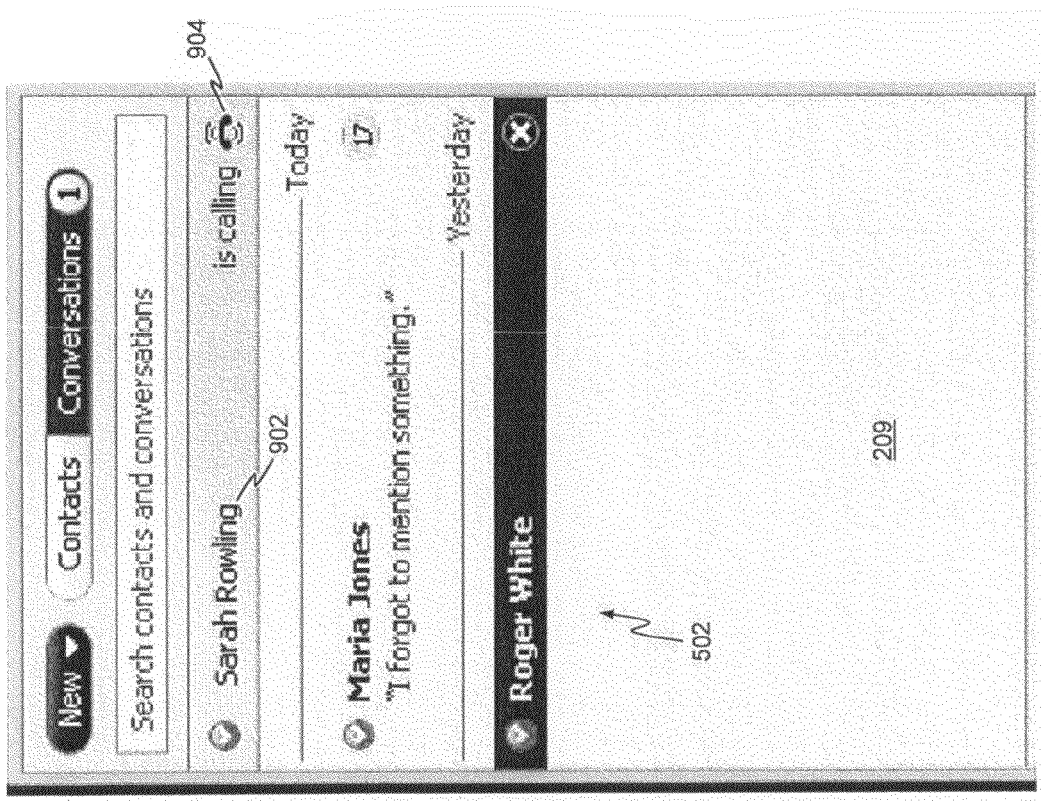
FIG. 9 shows the conversation list user interface with an incoming call.

Reference is now made to FIG. 9, which illustrates a further enhancement to the operation of the conversation list sorting technique shown in FIG. 6. Certain communication events have the specific property that they need to be acted on immediately. An example of this is a voice call. If a voice call is received at the client, the user needs to answer it within a short period of time, as otherwise the calling user will hang-up or be diverted to the called user's voicemail. Other examples of this type of communication event are a video call or a voicemail. It is therefore desirable to ensure that these communication events are brought to the user's attention immediately, regardless of how recently a previous communication event from this contact was received. As a result of this, the flowchart of FIG. 6 can be modified to assess the type of communication event, such that if the communication event is an incoming call (voice or video) or voicemail then an entry in the conversation list is always placed at the top of the list. This is illustrated in FIG. 9, where a notification of an incoming call from "Sarah Rowling" is displayed at the top of the conversation list 502 with an appropriate icon 904.

Furthermore, if an incoming call is unanswered, then an entry is placed in the conversation list 502 to notify the user of a missed call. Preferably, this type of event is also always placed at the top of the conversation list in order to increase its prominence to the user. However, in alternative embodiments, the time difference elapsed since the last communication event with this contact can be taken into account.

Figure 10:
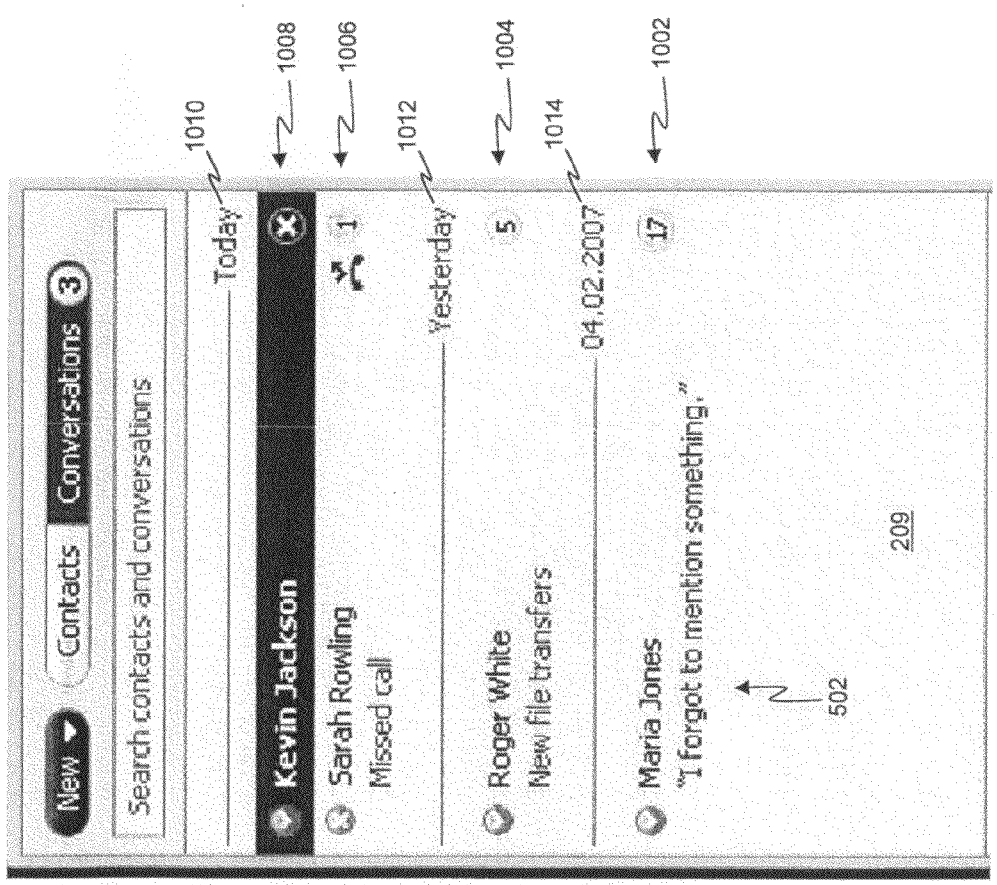
FIG. 10 shows the conversation list user interface with a plurality of entries arriving over a period of time.

FIG. 10 illustrates a conversation list 502 comprising several communication events from different contacts that have occurred over a period of time. In particular, FIG. 10 shows a set of 17 unread IM chat messages from "Maria Jones" (1002); a file transfer from "Roger White" (1004); a missed call from "Sarah Rowling" (1006); and a communication event from "Kevin Jackson" (1008) that has been selected and read by the user. FIG. 10 further illustrates how the entries in the conversation list 502 are divided up into a plurality of time categories (1010, 1012, 1014), such that a degree of chronology for the arrival of the communication events can be discerned by the user. Note however, that whilst these time categories do indicate the date on which a communication event was received, the individual entries within a single date are not necessarily in a precise chronological order, as they may or may not be moved within the conversation list depending on the time interval between subsequent communication events from a given contact (as described with reference to FIG. 6). Therefore, the conversation list 502 does not represent merely a chronological history of communication events.

FIG. 10 illustrates a selection of the types of communication event that can be shown in the conversation list. In particular, the conversation list 502 can include entries relating to the following communication events received at the client:
  Missed calls;
  New voicemails;
  IM chat message received;
  Incoming file transfer;
  Incoming authorisation request (i.e. from a person not yet in the user's contact list);
  Authorisation request accepted (i.e. a person has accepted a request for authorisation originating from the user of the client);
  Third party alerts (e.g. alerts from a payment provider); and
  Contact alerts (e.g. it is a contact's birthday).

Figure 11:
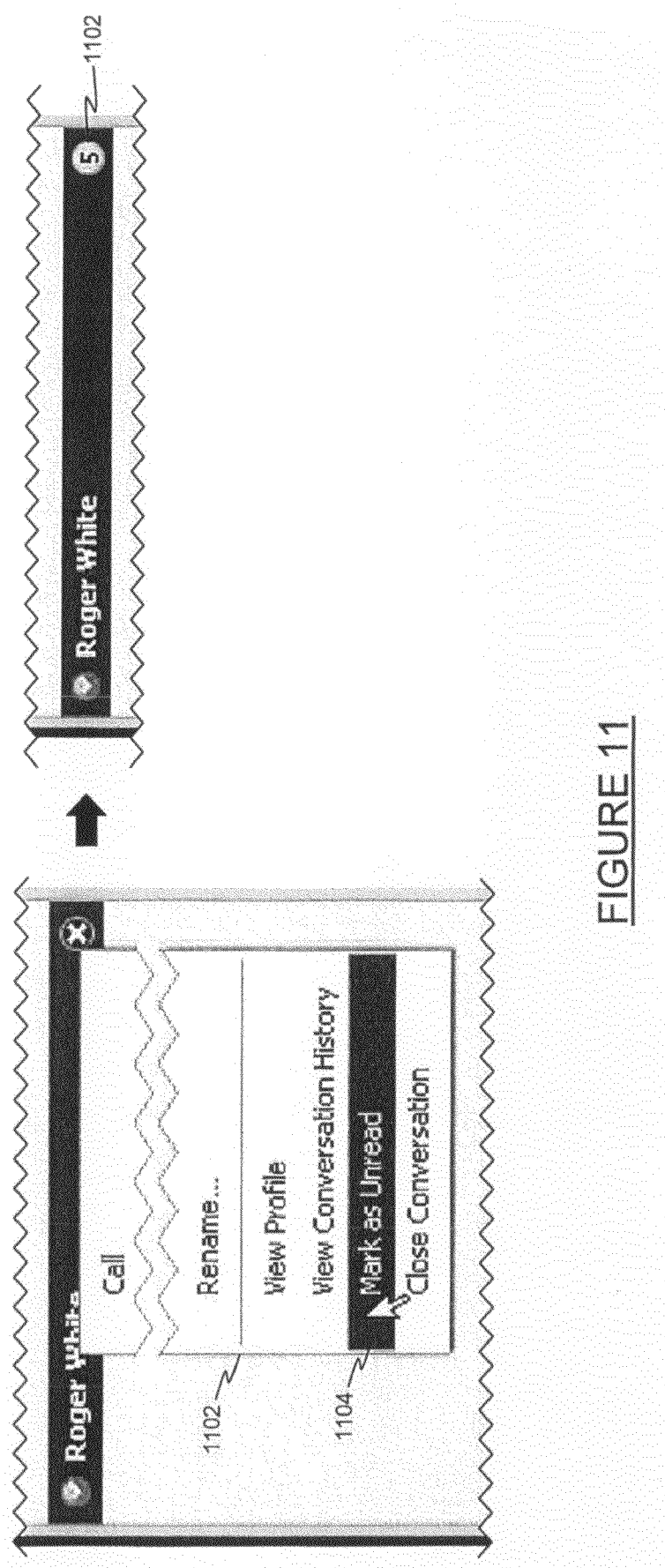
FIG. 11 shows marking an entry in the conversation list as unread.

FIG. 11 illustrates a further feature of the conversation list 502. Once the user has selected an entry in the conversation list 502, the entry is shown as read/acknowledged. However, after initially viewing the entry in the conversation list, the user may wish to act further on this communication event (e.g. by sending an IM message reply, or returning a voice call). In order to highlight the fact that the communication event requires further action, the user can select the entry in the conversation list such that a menu of options 1102 is displayed. One of these options is "Mark as unread" 1104. When this option is selected, an indictor 1106 is placed next to the entry in the conversation list 502 in order to highlight it to the user. The indicator is similar to the numerical indicators displayed for new communication events (such as indicator 508 of FIG. 5A). Marking a conversation as unread shows the number of communication events that were present before the entry was selected (i.e. marked as read). This means that if an entry in the conversation list had five unread communication events before being selected, then selecting the entry clears the numerical indicator 508 showing "5", and subsequently marking the entry as "unread" (with option 1104) restores the numerical indicator 508 showing "5". This therefore enables the user to rapidly see entries in the conversation list that are marked as requiring further attention (i.e. are unacknowledged), thereby ensuring that important communication events are not forgotten about or ignored.

In a further embodiment of the invention, the ordering of the entries in the conversation list can be based upon a weighting value assigned to each entry, such that the weighting value denotes a level of importance or priority to the entry. For example, communication events received from certain people can be more important to the user than others. It is therefore useful for the user to be able to assign importance or priority weightings to particular contacts in the contact list 208. Such importance or priority weightings can take the form of simple "low", "medium" or "high" weightings, or can be more precise, in the form of a one to ten rating. These weightings are set by the user and stored at the user terminal. Each contact will also have a default weighting, in case the user does not explicitly set a weighting. This can be, for example, a weighting of "medium" importance.

Figure 12:
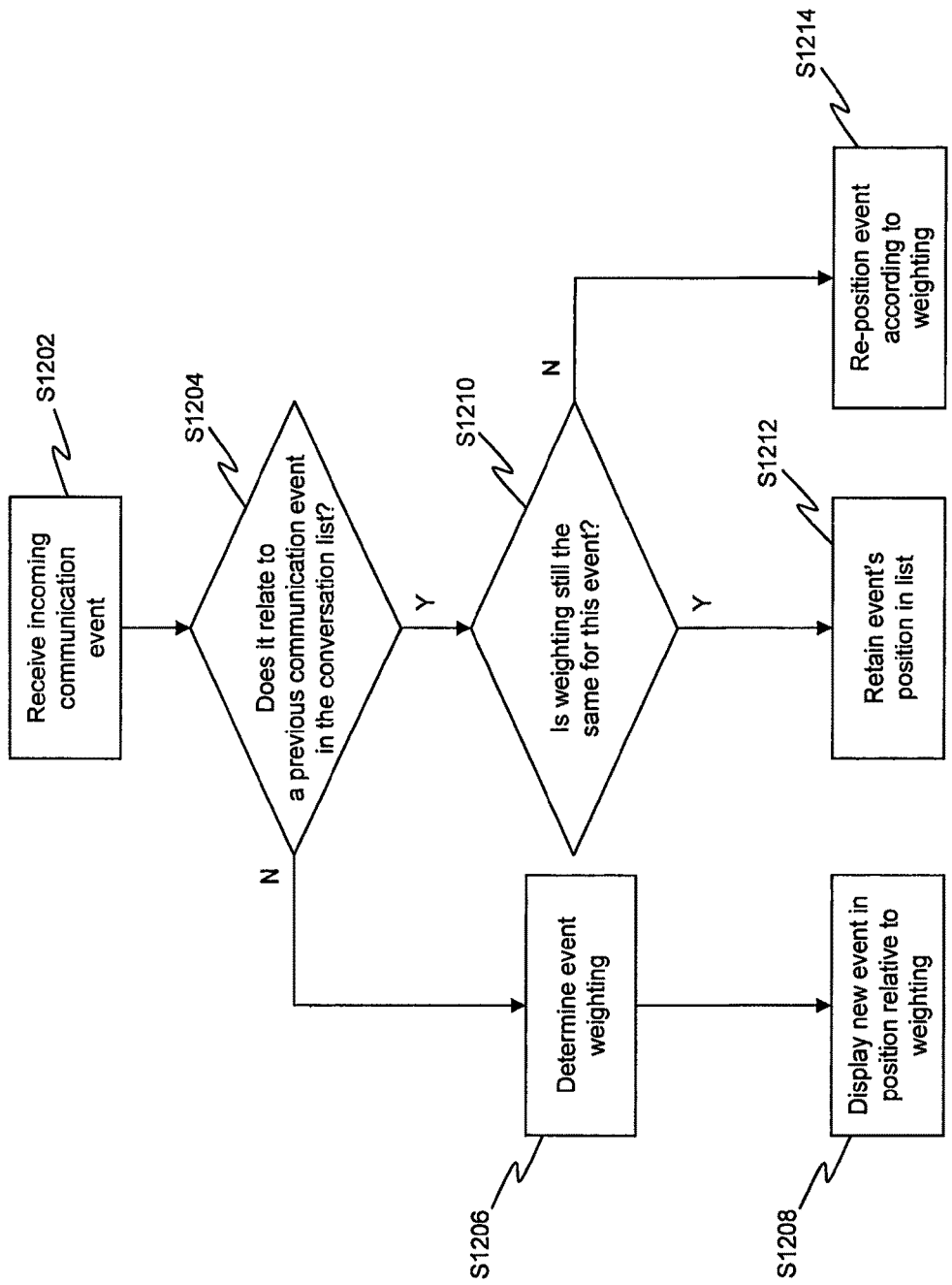
FIG. 12 shows a flowchart of an alternative method of sorting the entries in the conversation list.

Once the weightings are defined for the contacts, the ordering of the conversations list is performed according to the flowchart shown in FIG. 12. In S1202 an incoming communication event is received at the user terminal. In S1204 it is determined whether the incoming communication event relates to a previous entry already present in the conversation list 502. Preferably, this step checks whether an entry is already present in the conversation list 502 from the same contact as the newly received communication event.

If the communication event does not relate to a previous entry in the conversation list, then in step S1206 a weighting of the importance of the communication event is determined. This is performed by looking up the weighting value for the identity of the contact associated with of the communication event. In step S1208 a new entry is created in the conversation list. However, unlike in FIG. 6, in step S1208 this is not always placed at the top of the list. Rather it is placed according to the weighting value, such that it is below entries with a higher importance weighting, but above those with a lower importance weighting. Therefore, the highest priority events are at the top of the conversation list, and the lowest priority events are at the bottom of the conversation list. In this way, new events from contacts that are deemed less important are not made as prominent to the user, whereas ones that are deemed very important are made most prominent as they will be placed at the top of the conversation list.

Note that there can be situations where several events are in the list with the same weighting value (particularly if simple "low", "medium" and "high" categories are used). In this case, the newest entries are preferably placed at the top of the older entries having a given priority weighting. However, in alternative embodiments, other contention mechanisms can be used, such as placing the entries in alphabetical order.

Returning again to step S1204, if the communication event does relate to a previous entry in the conversation list, then in step S1210 it is checked whether the weighting value for this contact remains consistent with the current position of the event in the conversation list. This can occur because the user can change the importance weighting for a given contact between receiving communication events. For example, if the user is expecting to receive an important communication event from a particular contact, then he can increase the importance weighting to "high" in order to ensure that he does not overlook the communication event.

If the weighting value remains the same for the communication event then, in step S1212, the position of the entry in the conversation list is maintained, but updated to reflect the new communication event (as was shown with reference to FIG. 8C).

If the weighting value has changed, then in step S1214, the position of the entry in the conversation list is updated to reflect the changed weighting in a similar manner to the positioning of the new event in S1208. Specifically, the event is moved such that it is below entries with a higher importance weighting, but above those with a lower importance weighting. As described above, a contention mechanism is used when there are multiple entries with the same weighting value, such as placing the most recently received events above older events with the same weighting.

The flowchart in FIG. 12 therefore provides a technique by which a conversation list can be ordered such that communication events deemed to have a higher importance than others are made more prominent to the user.

In yet further embodiments, different measures of the weighting value can be used in combination with the flowchart of FIG. 12. For example, rather than associating a weighing of importance to the identity of a contact, difference weightings can be associated to different types of communication event. For example, communications events such as missed voice or video calls can be given "high" priority, instant messaging can be given "medium" priority, and other events such as file transfers can be given "low" priority. The operation of the flowchart of FIG. 12 is then identical, but the ordering of the conversation list now depends on the type of communication event received. For example, following the receipt of IM messages from a contact, then there is an entry in the conversation list for this contact. After a period of time and the receipt of other messages from other users, this entry is located in the middle of the conversation list. However, if there is a missed call from this contact, then this has a higher priority weighting than IM messages, and the entry is moved to the top of the list.

Furthermore, the importance weighting for a communication event can also be dependent on the contents of the communication event itself. For example, the user can define certain words as being a trigger for important messages. Therefore, the user defines a list of words and associates a particular priority weighting with each of these words. The contents of a message are compared to the trigger words, and any messages containing these words are given the associated weighting.

This can be of particular use with regards to setting the weighting of IM messages, where the contents of the messages are simple text. However, it can also be used for file transfers, by utilising the contents of the file or the filename, or for voicemails by utilising speech recognition technology. This can also be used in combination with any of the previous techniques for ordering the conversation list, to give an additional level of accuracy to the ordering of the entries in the conversation list.

While this invention has been particularly shown and described with reference to preferred embodiments, it will be understood to those skilled in the art that various changes in form and detail may be made without departing from the scope of the invention as defined by the appendant claims.

What is claimed is:

1. A method of sorting communication events at a user terminal connected to a communication network and executing a communication client arranged to be operable by a user, the method comprising:
   storing an event list comprising a list of identifiers, each identifier having information relating to at least one previously received communication event associated therewith, wherein the identifier identifies the initiator of the associated at least one previously received communication event and each identifier is listed only once in the list of identifiers;
   displaying the event list in a user interface of the communication client;
   receiving an incoming communication event at the user terminal from an initiating user over the communication network;
   determining whether the identifier of the initiating user is present in the list of identifiers stored in the event list;
   in the case that the identifier of the initiating user is present in the list of identifiers, amending the event list by adding information relating to the incoming communication event to the information relating to the at least one previously received communication event associated with the identifier of the initiating user and moving the identifier to the top in a display of the list of identifiers;

in the case that the identifier of the initiating user is not present in the list of identifiers, creating a new entry at the top of the event list comprising an identifier for the initiating user and having information relating to the incoming communication event associated therewith and moving the identifier to the top in a display of the list of identifiers; and updating the display of the event list in the user interface of the communication client.

2. A method according to claim 1, wherein the step of amending the event list further comprises moving the identifier of the initiating user to the top of the event list.

3. A method according to claim 1, wherein the step of amending the event list further comprises comparing the incoming communication event type to a set of predefined communication event types, such that, if the incoming communication event type is found in the set of predefined communication event types, the identifier of the initiating user is moved the top of the event list.

4. A method according to claim 1, wherein the step of amending the event list further comprises comparing the time difference between the arrival of the incoming communication event and the most recent at least one previously received communication event associated with the identifier of the initiating user, such that, on the condition that the time difference is greater than a predetermined value, the identifier of the initiating user is moved to the top of the event list, and on the condition that the time difference is less than a predetermined value, the identifier of the of the initiating user is retained at the same position in the event list.

5. A method according to claim 1, wherein the at least one previously received communication event comprises at least one of: a voice call; an instant message; a video call; a file transfer; and a voicemail.

6. A method according to claim 1, wherein the incoming communication event comprises: a voice call; an instant message; a video call; a file transfer; or a voicemail.

7. A method according to claim 1, further comprising the step of displaying the information relating to the at least one communication event responsive to the user of the user terminal selecting the corresponding identifier displayed in the event list.

8. A method according to claim 7, wherein, responsive to displaying the information relating to the at least one communication event, the visual appearance of the selected identifier in the event list displayed in the user interface is altered to indicate that the information relating to the at least one communication event has been viewed by the user.

9. A method according to claim 8, further comprising the step of reverting the visual appearance of the selected identifier to at least partially the same state as prior to selection by the user, responsive to the selection by the user of a control displayed in the user interface.

10. A method according to claim 1, further comprising the step of removing one of the identifiers from the event list responsive to the user of the user terminal actuating a selectable control in the user interface of the communication client.

11. A method according to claim 1, wherein the event list further comprises a count of the number of communication events received at the user terminal for each of the identifiers in the event list.

12. A method according to claim 11, wherein, responsive to the user selecting one of the identifiers displayed in the event list, the count for the selected one of the identifiers is reset to zero.

13. A method according to claim 1, wherein the step of displaying the event list in the user interface further comprises: grouping the identifiers into predetermined groups in dependence on the date on which the most recent at least one communication event associated with each identifier was received; and displaying the identifiers in the event list in the groups.

14. A method according to claim 1, wherein the communication network is a packet-based communication network.

15. A method according to claim 1, wherein the communication network is a peer to peer communication network.

16. A computer program product comprising a non-transitory medium storing program code which when executed by a computer performs an operation, the operating comprising:

storing an event list comprising a list of identifiers, each identifier having information relating to at least one previously received communication event associated therewith, wherein the identifier identifies the initiator of the associated at least one previously received communication event and each identifier is listed only once in the list of identifiers;

displaying the event list in a user interface of the communication client;

receiving an incoming communication event at the user terminal from an initiating user over the communication network;

determining whether the identifier of the initiating user is present in the list of identifiers stored in the event list;

in the case that the identifier of the initiating user is present in the list of identifiers, amending the event list by adding information relating to the incoming communication event to the information relating to the at least one previously received communication event associated with the identifier of the initiating user and moving the identifier to the to in a display of the list of identifiers;

in the case that the identifier of the initiating user is not present in the list of identifiers, creating a new entry at the to of the event list comprising an identifier for the initiating user and having information relating to the incoming communication event associated therewith and moving the identifier to the to in a display of the list of identifiers; and updating the display of the event list in the user interface of the communication client 17. A user terminal connected to a communication network and executing a communication client arranged to be operable by a user, comprising:

a storage means arranged to store an event list comprising a list of identifiers, each identifier having information relating to at least one previously received communication event associated therewith, wherein the identifier identifies the initiator of the associated at least one previously received communication event and each identifier is listed only once in the list of identifiers;

a receiving means arranged to receive an incoming communication event at the user terminal from an initiating user over the communication network;

a processing means arranged to determine whether the identifier of the initiating user is present in the list of identifiers stored in the event list, such that, in the case that the identifier of the initiating user is present in the list of identifiers, the processing means is arranged to amend the event list by adding information relating to the incoming communication event to the information relating to the at least one previously received communication event associated with the identifier of the initiating user and moving the identifier to the top in a display of the list of identifiers, and, in the case that the identifier of the initiating user is not present in the list of identifiers, the processing means is arranged to create a new entry at the top of the event list comprising an identifier for the initiating user and having information relating to the incoming communication event associated therewith and moving the identifier to the top in a display of the list of identifiers; and a display means arranged to display the event list in a user interface of the communication client.

18. A user terminal according to claim 17, wherein the processing means is arranged to further amend the event list by moving the identifier of the initiating user to the top of the event list.

19. A user terminal according to claim 17, wherein the processing means is arranged to further amend the event list by comparing the incoming communication event type to a set of predefined communication event types, such that, if the incoming communication event type is found in the set of predefined communication event types, the identifier of the initiating user is moved the top of the event list.

20. A user terminal according to claim 17, wherein the processing means is arranged to further amend the event list by comparing the time difference between the arrival of the incoming communication event and the most recent at least one previously received communication event associated with the identifier of the initiating user, such that, on the condition that the time difference is greater than a predetermined value, the identifier of the initiating user is moved to the top of the event list, and on the condition that the time difference is less than a predetermined value, the identifier of the of the initiating user is retained at the same position in the event list.

21. A user terminal according to claim 17, wherein the at least one previously received communication event comprises at least one of: a voice call; an instant message; a video call; a file transfer; and a voicemail.

22. A user terminal according to claim 17, wherein the incoming communication event comprises: a voice call; an instant message; a video call; a file transfer; or a voicemail.

23. A user terminal according to claim 17, wherein the display means is further arranged to display the information relating to the at least one communication event responsive to the user of the user terminal selecting the corresponding identifier displayed in the event list.

24. A user terminal according to claim 23, wherein, responsive to the display means displaying the information relating to the at least one communication event, the visual appearance of the selected identifier in the event list displayed in the user interface is altered to indicate that the information relating to the at least one communication event has been viewed by the user.

25. A user terminal according to claim 24, wherein the display means is further arranged to revert the visual appearance of the selected identifier to at least partially the same state as prior to selection by the user, responsive to the selection by the user of a control displayed in the user interface.

26. A user terminal according to claim 17, wherein the processing means is further arranged to remove one of the identifiers from the event list responsive to the user of the user terminal actuating a selectable control in the user interface of the communication client.

27. A user terminal according to claim 17, wherein the event list further comprises a count of the number of communication events received at the user terminal for each of the identifiers in the event list.

28. A user terminal according to claim 27, wherein, responsive to the user selecting one of the identifiers displayed in the event list, the count for the selected one of the identifiers is reset to zero.

29. A user terminal according to claim 17, wherein the display means is further arranged to group the identifiers into predetermined groups in dependence on the date on which the most recent at least one communication event associated with each identifier was received and display the identifiers in the event list in the groups.

30. A user terminal according to claim 17, wherein the communication network is a packet-based communication network.

31. A user terminal according to claim 17, wherein the communication network is a peer to peer communication network.

32. A method of sorting communication events at a user terminal connected to a communication network and executing a communication client arranged to be operable by a user, the method comprising:

storing an event list comprising a list of identifiers, each identifier having information relating to at least one previously received communication event and a priority weighting associated therewith, wherein the identifier identifies the initiator of the associated at least one previously received communication event, each identifier is listed only once in the list of identifiers, and the event list is ordered according to the priority weighting;

displaying the event list in a user interface of the communication client;

receiving an incoming communication event at the user terminal from an initiating user over the communication network;

determining whether the identifier of the initiating user is present in the list of identifiers stored in the event list;

in the case that the identifier of the initiating user is present in the list of identifiers, amending the event list by adding information relating to the incoming communication event to the information relating to the at least one previously received communication event associated with the identifier of the initiating user and moving the identifier to the top in a display of the list of identifiers;

in the case that the identifier of the initiating user is not present in the list of identifiers, determining the priority weighting for the incoming communication event and creating a new entry at a position in the event list in dependence on the priority weighting, the new entry comprising an identifier for the initiating user and having information relating to the incoming communication event associated therewith and moving the identifier to the top in a display of the list of identifiers; and updating the display of the event list in the user interface of the communication client.

33. A method according to claim 32, further comprising the step of receiving and storing a list of priority weightings associated with each identifier from the user.

34. A method according to claim 33, wherein the step of determining the priority weighting for the incoming communication event comprises retrieving the priority weighting for the initiating user of the incoming communication event from the list of priority weightings.

35. A method according to claim 32, further comprising the step of storing a list of priority weightings associated with each communication event type.

36. A method according to claim 35, wherein the step of determining the priority weighting for the incoming communication event comprises determining the incoming communication event type and retrieving the priority weighting for the incoming communication event type from the list of priority weightings.

37. A method according to claim 32, further comprising the step of receiving and storing a list of priority weightings associated with predetermined words from the user.

38. A method according to claim 37, wherein the step of determining the priority weighting for the incoming communication event comprises analysing the contents of the incoming communication event and matching the contents to predetermined words in the list of priority weightings.

39. A method according to claim 32, wherein the step of amending the event list further comprises updating the associated priority weighting and re-ordering the event list according to the updated priority weighting.

40. A user terminal connected to a communication network and executing a communication client arranged to be operable by a user, comprising:
   a storage means arranged to store an event list comprising a list of identifiers, each identifier having information relating to at least one previously received communication event and a priority weighting associated therewith, wherein the identifier identifies the initiator of the associated at least one previously received communication event, each identifier is listed only once in the list of identifiers, and the event list is ordered according to the priority weighting;
   a receiving means arranged to receive an incoming communication event at the user terminal from an initiating user over the communication network;
   a processing means arranged to determine whether the identifier of the initiating user is present in the list of identifiers stored in the event list, such that, in the case that the identifier of the initiating user is present in the list of identifiers, the processing means is arranged to amend the event list by adding information relating to the incoming communication event to the information relating to the at least one previously received communication event associated with the identifier of the initiating user and moving the identifier to the top in a display of the list of identifiers, and, in the case that the identifier of the initiating user is not present in the list of identifiers, the processing means is arranged to determine the priority weighting for the incoming communication event and create a new entry at a position in the event list in dependence on the priority weighting, the new entry comprising an identifier for the initiating user and having information relating to the incoming communication event associated therewith and moving the identifier to the top in a display of the list of identifiers; and
   a display means arranged to display the event list in a user interface of the communication client.

41. A user terminal according to claim 40, wherein the storage means is further arranged to receive and store a list of priority weightings associated with each identifier from the user in the storage means.

42. A user terminal according to claim 41, wherein the processing means is arranged to determine the priority weighting for the incoming communication event by retrieving the priority weighting for the initiating user of the incoming communication event from the list of priority weightings.

43. A user terminal according to claim 40, wherein the storage means is further arranged to store a list of priority weightings associated with each communication event type.

44. A user terminal according to claim 43, wherein the processing means is arranged to determine the priority weighting for the incoming communication event by determining the incoming communication event type and retrieving the priority weighting for the incoming communication event type from the list of priority weightings.

45. A user terminal according to claim 40, wherein the storage means is further arranged to receive and store a list of priority weightings associated with predetermined words from the user.

46. A user terminal according to claim 45, wherein the processing means is arranged to determine the priority weighting for the incoming communication event by analysing the contents of the incoming communication event and matching the contents to predetermined words in the list of priority weightings.

47. A user terminal according to claim 40, wherein the processing means is arranged to amend the event list by updating the associated priority weighting and re-ordering the event list according to the updated priority weighting.

48. A computer program product comprising a non-transitory medium storing program code which when executed by a computer performs an operation, the operating comprising:
   storing an event list comprising a list of identifiers, each identifier having information relating to at least one previously received communication event and a priority weighting associated therewith, wherein the identifier identifies the initiator of the associated at least one previously received communication event, each identifier is listed only once in the list of identifiers, and the event list is ordered according to the priority weighting;
   displaying the event list in a user interface of the communication client;
   receiving an incoming communication event at the user terminal from an initiating user over the communication network;
   determining whether the identifier of the initiating user is present in the list of identifiers stored in the event list;
   in the case that the identifier of the initiating user is present in the list of identifiers, amending the event list by adding information relating to the incoming communication event to the information relating to the at least one previously received communication event associated with the identifier of the initiating user and moving the identifier to the top in a display of the list of identifiers;
   in the case that the identifier of the initiating user is not present in the list of identifiers, determining the priority weighting for the incoming communication event and creating a new entry at a position in the event list in dependence on the priority weighting, the new entry comprising an identifier for the initiating user and having information relating to the incoming communication event associated therewith and moving the identifier to the top in a display of the list of identifiers; and
   updating the display of the event list in the user interface of the communication client.

* * * * *